Dec. 23, 1958

W. H. STUELLEIN ET AL 2,866,047

MEANS FOR CONDUCTING CURRENT BETWEEN
RELATIVELY MOVABLE MEMBERS

Filed Dec. 29, 1955

INVENTORS
William H. Stuellein &
James H. Sprow.
BY
ATTORNEY

United States Patent Office 2,866,047
Patented Dec. 23, 1958

2,866,047

MEANS FOR CONDUCTING CURRENT BETWEEN RELATIVELY MOVABLE MEMBERS

William H. Stuellein, North Versailles Township, Allegheny County, and James H. Sprow, Monroeville, Pa., assignors to Westinghouse Electric Corporation, East Pittsburgh, Pa., a corporation of Pennsylvania Application December 29, 1955, Serial No. 556,139

10 Claims. (Cl. 200—166)

Our invention relates, generally, to electric devices having relatively movable members through which current must be conducted and, more particularly, to switches or circuit breakers having movable current conducting joints.

The problem of conducting current between relatively movable members of disconnecting switches and circuit breakers has not heretofore been entirely satisfactorily solved. Various devices, such as flexible shunts or pigtails, and spring members have been utilized. The prior devices have certain disadvantages, such as short life, high cost, or unreliability.

Briefly stated, a good rotatable current carrying hinge should not have to be pampered, usually at high cost. In other words, it must be rugged, should have sufficient thermal capacity, should be easy to assemble and later to maintain. It should be of self-compensating construction as a safeguard against failure after wear occurs, should be of high mechanical life and yet be low in manufacturing cost. On exposed outdoor applications, such as on high voltage switches, it is further a necessity to have the current conducting hinge fully enclosed because of icing conditions, which would certainly impair the operation of any hinge construction where vital parts of the conducting hinge are subject to ice coating.

Accordingly, an object of our invention is to provide a means for conducting current between rotatable or reciprocating members of an electric switch or circuit breaker which shall be efficient and reliable in operation and which may be economically manufactured and installed.

A more specific object of our invention is to provide totally enclosed relatively movable current conducting members for an electric switch.

Another object of our invention is to provide relatively movable current conducting members which are self-compensating for wear between the members.

A further object of our invention is to maintain uniform pressure between relatively movable current conducting members.

Other objects of our invention will be explained fully hereinafter or will be apparent to those skilled in the art.

In accordance with one embodiment of our invention, two compressed metallic members, each of which is composed of silver-plated copper fibers or ribbons knitted into a mesh and then compressed into a cylindrical mass having a conical recess in one end, are disposed in spaced relation inside a cylindrical portion of a terminal member. The flat end of each compressed mass of fibers is biased outwardly by spring means against a terminal arm having a projection rotatably disposed in the end of the cylindrical member. Current may flow from the terminal member through the compressed mass to the terminal arms and thence to a switch blade clamped between the terminal arms. Likewise, current may flow through the members in the opposite direction.

For a better understanding of the nature and objects of the invention, reference may be had to the following detailed description, taken in conjunction with the accompanying drawings, in which.

Figure 1:
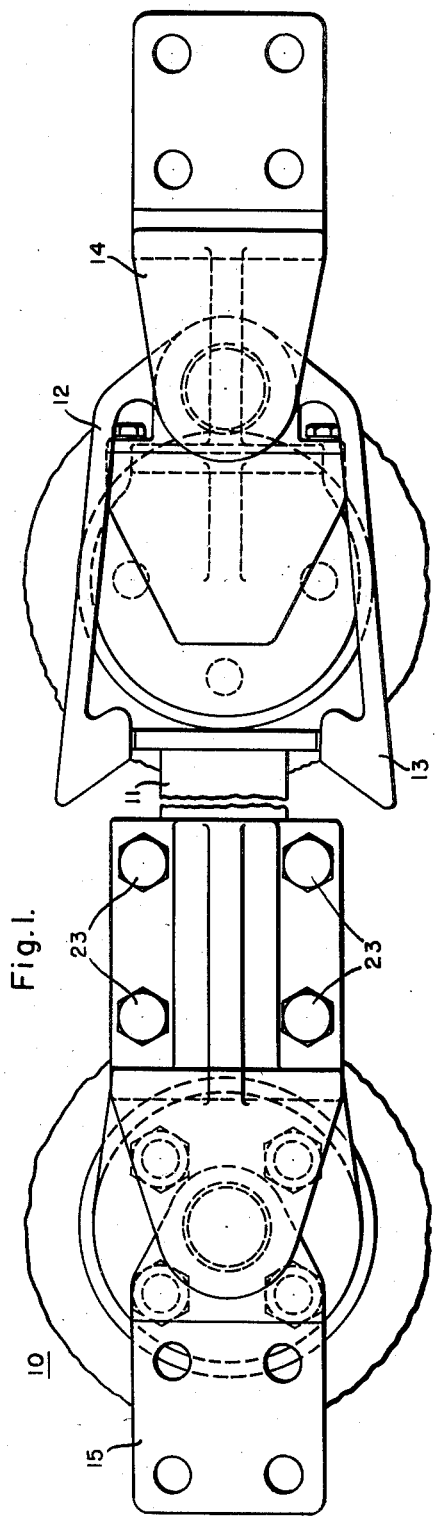
Figure 1 is a view, in plan, of a disconnecting switch embodying the principal features of the invention.

Referring to the drawings, and particularly to Fig. 1, the disconnecting switch shown therein is of the side-break type and comprises, generally, a rotating or hinge contact assembly 10, a blade 11 and a stationary or break contact assembly 12. In accordance with the usual practice, the switch may be mounted on a base or other supporting structure (not shown).

The switch may be actuated in a manner well known in the art by providing an operating mechanism for rotating the insulator which supports the hinge assembly 10 to cause the blade 11 to swing in a horizontal plane to be disengaged from or to engage break contact jaws 13 which are rotatably mounted on a terminal member 14 which, in turn, is supported by a fixed insulator mounted on the base of the switch. Power conductors may be connected to the terminal member 14 and to a terminal member 15 of the hinge contact assembly, thereby completing an electrical circuit through the switch when the blade 11 is in the closed position.

Figure 2:
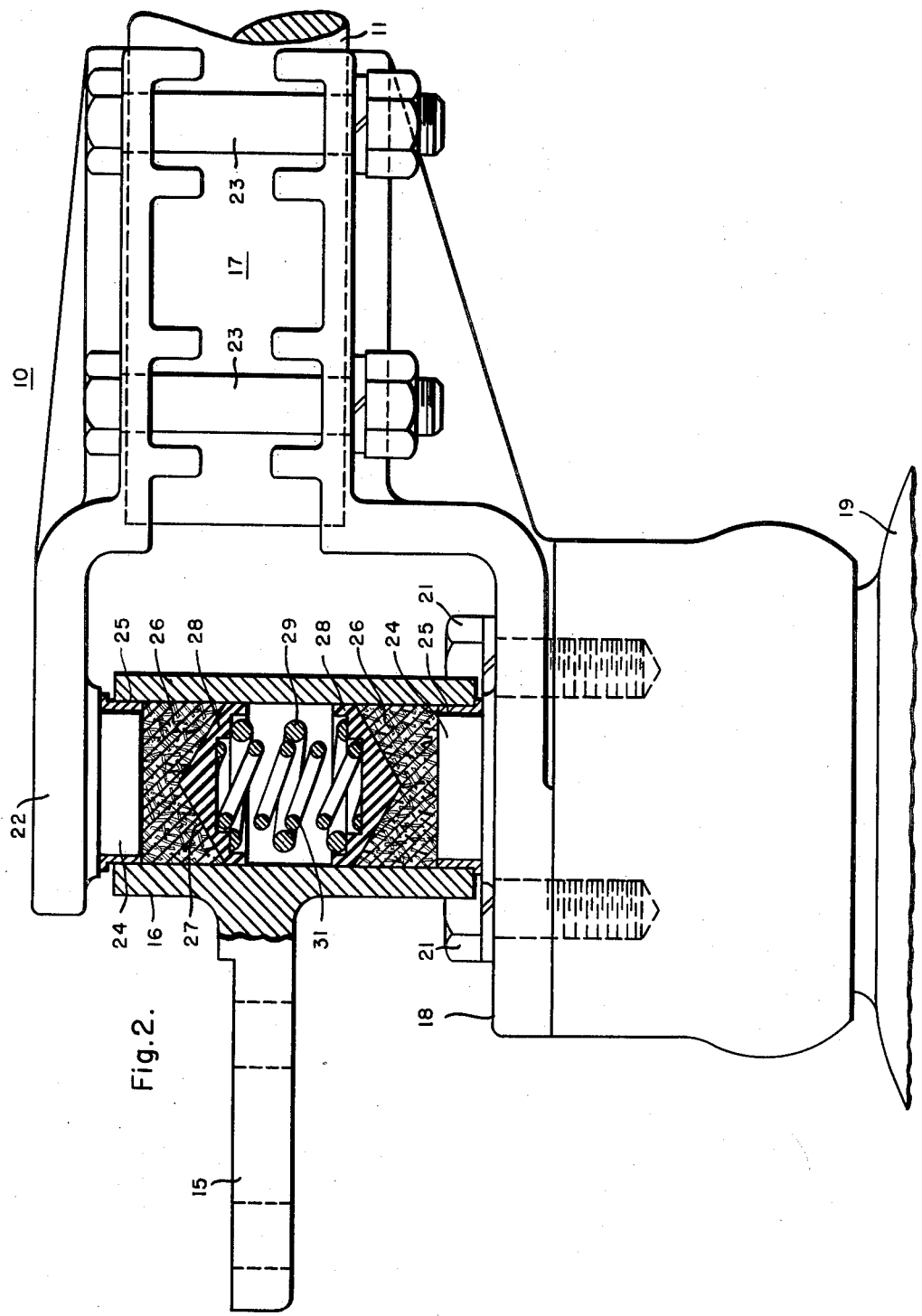
Fig. 2 is an enlarged view, partly in elevation and partly in section, of the hinge terminal for the switch shown in Fig. 1.

As shown more clearly in Fig. 2, the rotating or hinge contact assembly 10 comprises the terminal member 15, which has a cylindrical portion 16 formed integrally therewith, and a blade clamping member 17 which has a lower arm 18 secured to an insulator 19 by bolts 21 and an upper arm 22 which may be drawn against the switch blade 11 by bolts 23 thereby clamping the blade 11 in the member 17. The arm 18 has an upwardly extending cylindrical portion 24 which extends into the lower end of the cylindrical member 16. The arm 22 has a similar projection 24 which extends downwardly into the upper end of the cylindrical member 16. A bearing sleeve 25 is provided on each one of the projections 24. The bearing sleeves may be replaced in case they become worn excessively. Thus, the switch blade 11, which is secured in the clamping member 17, may be rotated relative to the fixed terminal member 15 by rotating the insulator 19.

As explained hereinbefore, the problem of conducting current through or around a rotatable joint has not previously been entirely satisfactorily solved. The devices, such as flexible shunts and spring contact members, previously utilized have certain disadvantages such as a relatively short life, relatively high cost and unreliability. In order to overcome the disadvantages of the prior devices, we have devised the present structure.

Figure 4:
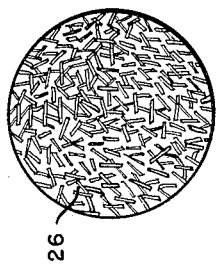
Fig. 4 is an enlarged view, in plan, of one of the sponge members after it is compressed.
Figure 3:
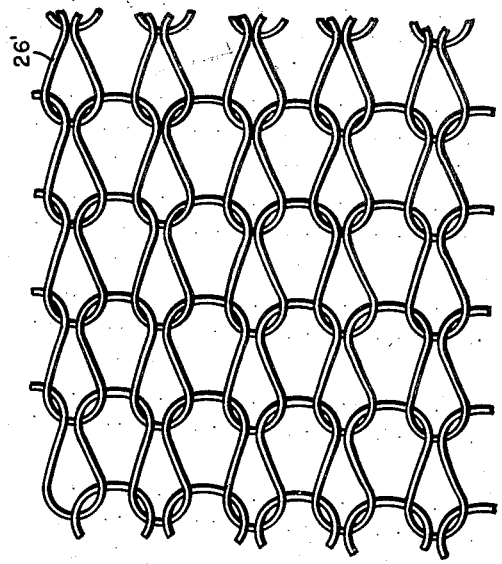
Fig. 3 is an enlarged view of the metal mesh of which the sponge member is composed.

As shown, two compressed metallic fiber members 26 are disposed inside the cylindrical member 16 in spaced relation. Each one of the members 26 is composed of metallic fibers or ribbons which may be knitted into a mesh 26′, as shown in Fig. 3, and then formed or compressed into a mass 26, as shown in Fig. 4, having a conical recess 27 in one end as shown in Fig. 2. The metal fibers or ribbons are preferably silver-plated copper or other metal having a high electrical conductivity. The fibrous mass 26 is like metallic wool or a metallic sponge, but is somewhat pressed together and formed into the cylindrical shape, with the individual metal fibers retaining a certain amount of inherent resiliency and providing a multiplicity of contact points or lines engaging the relatively movable members.

A conically-shaped member 28, composed of insulating material, is disposed in each recess 27. Thus, current cannot flow through the members 28, but must flow through the members 26. Compression springs 29 and 31 are disposed between the conically-shaped members 28. Because of the sloping surfaces of the members 28 and the recesses 27, the force of the springs 29 and 31 is divided into two components acting in different directions. One component pushes one surface of each of the masses 26 against one of the opposed ends of the projections 24 and the other spreads the masses 26 outwardly against the internal wall of the cylindrical member 16. As previously explained, the bolts 23 draw the arms 18 and 22 together, thereby retaining the projections 24 in the cylindrical member 16 against the force of the springs 29 and 31. Accordingly, current may flow from the terminal plate 15 through the compressed metallic masses 26 to the projections 24 which are formed integrally with the arms of the clamping member 17. As previously explained, the switch blade 11 is secured in the clamping member 17.

The pressure of the springs 29 and 31 on the metallic masses 26 maintains good electrical contact between the multiplicity of individual contact surfaces of the masses 26, the cylindrical members 16 and the projections 24 on the clamping member 17. Any mechanical wear at the joint between the projections 24 and the members 26 is automatically taken up by the pressure of the springs 29 and 31 on the compressed members 26. Likewise, any wear between the masses or members 26 and the cylindrical member 16 is taken care of by the spreading force of the conically-shaped members 28 on the compressed members 26. Furthermore, the texture of the compressed members 26 is such that they have a slightly abrasive action on the wall of the cylindrical member 16 and the ends of the projections 24, thereby cleaning the contact surfaces of these members. Since the conducting surfaces of the relatively movable contact members are totally enclosed, they are protected against dirt, moisture and ice accumulations.

The joint between the break jaws 13 and the terminal member 14 of the stationary contact assembly 12 is somewhat similar to the joint shown in Fig. 2. Therefore, in the interest of simplicity, it is not illustrated and described in the present application. Current is conducted from the member 13, which may rotate relative to the member 14, through compressed metallic masses to the terminal member 14.

While we have illustrated and described the manner in which the present invention is utilized to conduct current between rotatable members, it is apparent that the present invention may also be utilized to conduct current between a reciprocating rod or member which is disposed inside or extends through a housing. The compressed metallic member may surround the reciprocating rod and be compressed against the rod and the housing by spring means in a manner similar to that shown in the present drawing.

From the foregoing description, it is apparent that we have provided for conducting current between two relatively movable members in a manner which is simple and inexpensive. Furthermore, a high degree of conductivity is maintained during the life of the structure. The present invention is particularly suitable for utilization in disconnecting switches, but is not necessarily limited thereto as it may be utilized in circuit breakers and other electrical devices where it is necessary to conduct current between members which are movable relative to each other.

Since numerous changes may be made in the above described construction, and different embodiments of the invention may be made without departing from the spirit and scope thereof, it is intended that all matter contained in the foregoing description or shown in the accompanying drawings shall be interpreted as illustrative and not in a limiting sense.

We claim as our invention:

1. In an electric device, in combination, a first conducting member, a second conducting member movable relative to the first member and having a portion disposed adjacent the first member, a compressed mass composed of a plurality of fibers of metal having a good conductivity, a member having a sloping surface engaging said mass, and resilient means for applying pressure on the member having a sloping surface to force said compressed mass into engagement with both of said conducting members, whereby current is conducted between said conducting members through said compressed mass.

2. In an electric device, in combination, a first conducting member having a cylindrical portion, a second conducting member having projecting portions rotatably disposed in the ends of said cylindrical portion, a compressed metallic fiber mass disposed inside the cylindrical portion, and resilient means disposed to apply pressure on said fiber mass to press it into engagement with both conducting members.

3. In an electric switch, in combination, a first conducting member having a cylindrical portion, a second conducting member having projecting portions rotatably disposed in the ends of said cylindrical portion, two compressed metallic fiber masses disposed inside the cylindrical portion, resilient means disposed between said fiber masses to press them into engagement with both conducting members, and members having conically-shaped ends disposed between the resilient means and the fiber masses.

4. In an electric switch, in combination, a first conducting member having a cylindrical portion, a second conducting member having projecting portions rotatably disposed in the ends of said cylindrical portion, two compressed metallic fiber masses disposed inside the cylindrical portion, each one of said fiber masses having a conical recess in one end, a member having a conically-shaped end in each recess, and means disposed between said fiber masses and engaging said conically-shaped members to press the fiber masses into engagement with both conducting members.

5. In an electric switch, in combination, a first conducting member having a cylindrical portion, a second conducting member having projecting portions rotatably disposed in the ends of said cylindrical portion, two compressed metallic fiber masses disposed inside the cylindrical portion, each one of said fiber masses having a conical recess in its inner end, a conically-shaped member in each recess, and a compression spring disposed between the inner ends of said conically-shaped members to press the fiber masses against the wall of the cylindrical portion and against the projecting portions of the second conducting member.

6. In an electric switch, in combination, a terminal member having a cylindrical portion, a rotatable insulator, a blade clamping member secured to said insulator, said clamping member having two arms each one of which has a projection extending into an end of the cylindrical portion, two compressed metallic fiber masses disposed inside the cylindrical portion, each one of said fiber masses having a conical recess in its inner end, a conically-shaped member in each recess, a compression spring disposed between the inner ends of said conically-shaped members, and threaded means for drawing said arms together to retain their projections in the cylindrical portion.

7. In an electric switch, in combination, a rotatable insulator, a fixed insulator spaced from the rotatable insulator, a break contact member rotatably mounted on the fixed insulator, a blade clamping member secured to the rotatable insulator, a switch blade secured in the clamping member and engaging the break contact member when in the closed position, a terminal member having a cylindrical portion, said clamping member having two arms each one of which has a projection extending into an end of the cylindrical portion, two compressed metallic fiber masses disposed inside the cylindrical portion, each one of said fiber masses having a conical recess in its inner end, a conically-shaped member in each recess, a compression spring disposed between the inner ends of said conically-shaped members, and threaded means in the clamping member for drawing said arms together to retain their projections in the cylindrical portion.

8. In a side-break electric switch, in combination, a rotatable insulator, a fixed insulator spaced from the rotatable insulator, a break contact assembly rotatably mounted on the fixed insulator, a hinge contact assembly mounted on the rotatable insulator, a switch blade secured in the hinge contact assembly and engaging the break contact assembly when in the closed position, each one of said contact assemblies comprising a first conducting member having a cylindrical portion, a second conducting member having two arms each one of which has a projection extending into an end of the cylindrical portion, two compressed metallic fiber masses disposed inside the cylindrical portion, each one of said fiber masses having a conical recess in its inner end, a conically-shaped member in each recess, a compression spring disposed between the inner ends of said conically-shaped members, and threaded means for drawing said arms together to retain their projections in the cylindrical portion.

9. In an electric device, in combination, a first conducting member, a second conducting member movable relative to the first member and having a portion disposed adjacent the first member, a metallic fiber mass engaging said members, an insulating member having a sloping surface engaging said mass, and resilient means for applying force on said insulating member to press said mass against said conducting members.

10. In an electric switch, in combination, a rotatable insulator, a fixed insulator spaced from the rotatable insulator, a break contact member rotatably mounted on the fixed insulator, a blade clamping member secured to the rotatable insulator, a switch blade secured in the clamping member and engaging the break contact member when in the closed position, said clamping member having two spaced arms, each arm having a flat surface thereon, a terminal member having a portion disposed between said arms, two spaced compressed metallic fiber masses for conducting current between the terminal member and the arms, each fiber mass having a flat surface engaging the flat surface on one of said arms, and said arms being held together by the clamping member for causing biasing of the flat surfaces on the arms and the flat surfaces on the fiber masses together.

References Cited in the file of this patent
UNITED STATES PATENTS

| | | |
|---|---|---|
| 1,999,981 | Ruger | Apr. 30, 1935 |
| 2,487,187 | Seifried et al. | Nov. 8, 1949 |